United States Patent
Medinger et al.

Patent Number: 5,883,167
Date of Patent: Mar. 16, 1999

[54] PROCESS FOR THE PREPARATION OF HIGHLY COLOURED DIAZO PIGMENT MIXTURES

[75] Inventors: Bernhard Medinger, Grottenweg; Daniel Andrey, Châtel-St-Denis, both of Switzerland

[73] Assignee: Ciba Specialty Chemicals Corporation, Tarrytown, N.Y.

[21] Appl. No.: 903,467

[22] Filed: Jul. 31, 1997

[51] Int. Cl.$^6$ .............................. C08K 5/23; C09B 27/00; C09B 43/32

[52] U.S. Cl. .......................... 524/190; 106/496; 534/588; 534/820

[58] Field of Search ............................. 524/190; 106/496; 534/588, 820

[56] References Cited

U.S. PATENT DOCUMENTS 5,518,539  5/1996  Hao et al. ................................ 106/495

FOREIGN PATENT DOCUMENTS 1595489  8/1981  United Kingdom .

OTHER PUBLICATIONS

Derwent Abstract 77–35332Y (JP 52043848).
Chem. Abstr. vol. 83, No. 2, 12161e, (1975).

*Primary Examiner*—Tae Yoon
*Attorney, Agent, or Firm*—Jacob M. Levine

[57] ABSTRACT

A process for the preparation of diazo pigment mixtures, which comprises condensing 2 mol of an azocarboxylic acid chloride of formula

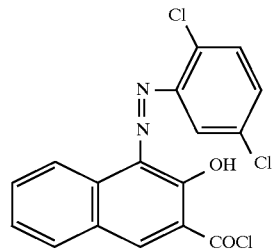

with 1 mol of a mixture of diamines of formulae

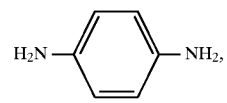

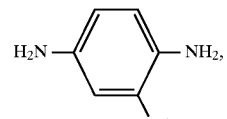

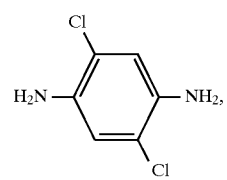

at a molar ratio of II:III:IV from 0–30:5–60:40–95, the condensation and isolation of the product obtained being carried out by customary methods.

The diazo pigment mixtures so obtained are distinguished by high color strength and chroma.

9 Claims, No Drawings

PROCESS FOR THE PREPARATION OF HIGHLY COLOURED DIAZO PIGMENT MIXTURES

The present invention relates to a process for the preparation of highly coloured diazo pigment mixtures by condensing 2 mol of an azocarboxylic acid chloride with 1 mol of a mixture consisting of 2 or 3 different phenylene diamines. The products obtained are distinguished by outstanding colour strength and/or chroma.

GB 1 595 489 discloses that diazo pigment mixtures having good colouristic properties are obtained by condensing 2 mol of a mixture of different azocarboxylic acid chlorides of the general formula

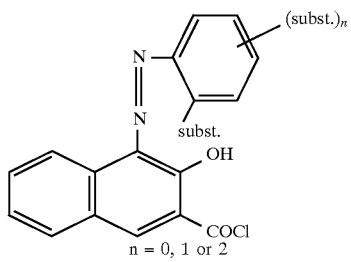

with 1 mol of a diamine of formula

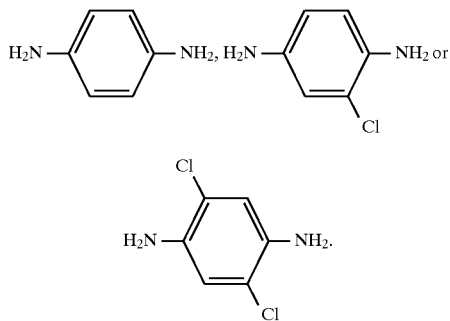

Page 8, lines 8 and 9 states that it is also possible to use mixtures of different diamines instead of uniform diamines without any surprising effect being thereby attained.

Contrary to this statement and entirely surprisingly it has now been found that, starting from the uniform azocarboxylic acid chloride of formula

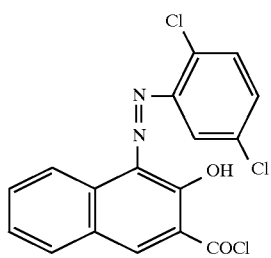

with a mixture of 2 or 3 diamines of formula

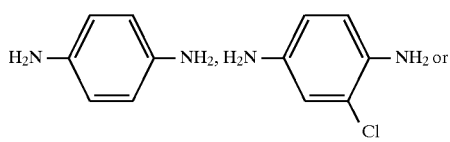

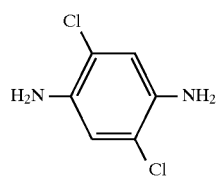

at specific mixing ratios, it is possible to obtain diazo pigment mixtures which are distinguished by unexpectedly enhanced colour strength and/or chroma as compared to the corresponding single compounds or physical mixtures of single compounds.

Accordingly, this invention relates to a process for the preparation of diazo pigment mixtures, which comprises condensing 2 mol of an azocarboxylic acid chloride of formula

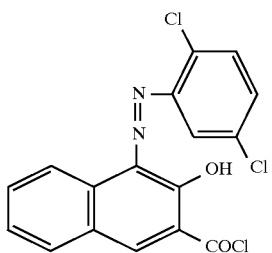

(I)

with 1 mol of a mixture of diamines of formulae

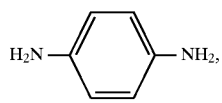

(II)

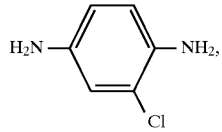

(III)

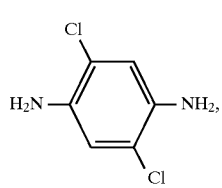

(IV)

at a molar ratio of
II:III:IV from 0–30:5–60:40–95,
the condensation and isolation of the product obtained being carried out by customary methods.

Particularly interesting products are obtained using a diamine mixture at a molar ratio of
II:III:IV from 0–25:5–50:50–90,
preferably a diamine mixture at a molar ratio of
II:III:IV from 5–15:8–30:70–87
and, more preferably, a diamine mixture at a molar ratio of
II:III:IV of 10:10:80.

The azocarboxylic acid chloride of formula I and the diamines of formulae II, III and IV are known substances (e.g. from GB 1 595 489).

As mentioned above, the condensation is carried out by customary methods such as those described, inter alia, in GB 1 595 489.

Using the 3 diamines of formulae II, III and IV at a molar ratio of

II:III:IV of 25:25:50
gives a solid solution consisting of the diazo pigments of formulae

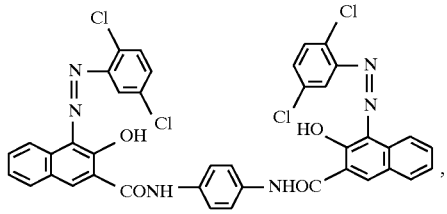

(C.I. Pigment Red 166)

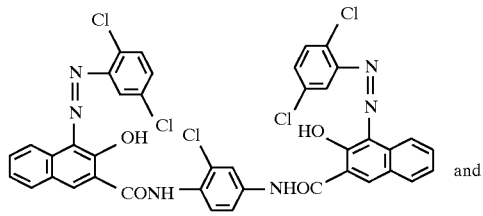

(C.I. Pigment Red 144)

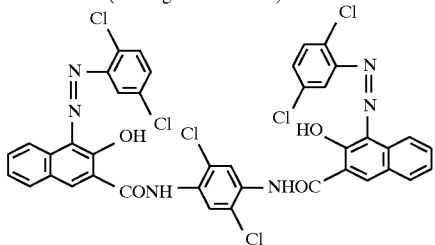

(C.I. Pigment Red 214)

at a molar ratio of V:VI:VII of 25:25:50.

This solid solution is novel and is a further object of this invention.

A solid solution is characterised by its X-ray diffraction patterns, the X-ray diffraction patterns of the solid solution being different from those of the single components and of the physical mixture of the single components.

The mixed condensates obtained by the process of this invention, including also the novel solid solution, are valuable pigments for colouring high molecular weight organic material.

High molecular weight organic materials which can be coloured or pigmented with the pigments obtained according to this invention are typically cellulose ethers and esters, such as ethyl cellulose, nitrocellulose, cellulose acetate, cellulose butyrate, natural or synthetic resins, such as polymerisation or condensation resins, e.g. aminoplasts, in particular urea/ formaldehyde resins and melamine/ formaldehyde resins, alkyd resins, phenolic plastics, polycarbonates, polyolefins, polystyrene, polyvinyl chloride, polyamides, polyurethanes, polyesters, ABS, polyphenylene oxides, rubber, casein, silicone and silicone resins, singly or in admixture.

The indicated high molecular weight organic compounds can be obtained singly or as mixtures in the form of plastics, melts or in the form of spinning solutions, varnishes, paints or printing inks. Depending on the end use requirement, it is expedient to use the novel pigments as toners or in the form or preparations.

The pigments prepared according to this invention can be used in an amount of 0.01 to 30% by weight, preferably of 0.1 to 10% by weight, based on the high molecular weight organic material to be pigmented.

The pigmenting of the high molecular weight organic substances with the pigments prepared according to this invention is conveniently effected by incorporating such pigments by themselves or in the form of masterbatches in these substrates using roll mills, mixing or milling apparatus. The pigmented material is then brought into the desired final form by methods which are known per se, conveniently by calendering, moulding, extruding, coating, casting or by injection moulding. It is often desirable to incorporate plasticisers into the high molecular weight compounds before processing in order to produce non-brittle mouldings or to diminish their brittleness. Suitable plasticisers are typically esters of phosphoric acid, phthalic acid or sebacic acid. The plasticisers may be incorporated into the pigments prepared according to this invention before or after working the pigments into the polymers. To obtain different shades, it is also possible to add to the high molecular weight organic materials fillers or other chromophoric components such as white, coloured or black pigments in any amount, in addition to the pigments prepared according to this invention.

For pigmenting paints, coating materials and printing inks, the high molecular weight organic materials and the pigments prepared according to this invention, together with optional additives such as fillers, other pigments, siccatives or plasticisers, are finely dispersed or dissolved in a common organic solvent or solvent mixture. The procedure may be such that the individual components by themselves, or also several jointly, are dispersed or dissolved in the solvent and thereafter all the components are mixed.

The pigments prepared according to this invention are particularly suitable for colouring plastic materials, preferably polyolefins and, in particular, polypropylene fibres.

When used for colouring e.g. polyvinyl chloride or polyolefins, the pigments prepared according to this invention are distinguished by good allround pigment properties, such as good dispersibility, good fastness to migration, heat, light and weathering as well as good opacity and, in particular, very high colour strength and purity.

The following Examples illustrate the invention.

EXAMPLE 1 a) 72.2 g of a finely dispersed azo dye obtained by customary methods by coupling diazotised 1-amino-2,5-dichlorobenzene with 2,3-hydroxynaphthoic acid are heated, with stirring, in admixture with 520 g of o-dichlorobenzene to 85° C. 32.7 g of thionyl chloride are then added dropwise over 10 minutes at 80°–90° C. This reaction mixture is then heated further and kept for one hour at 115°–120° C. After cooling to 20° C., the precipitated crystalline azo dye carboxylic acid chloride is isolated by filtration, wash ed with a small amount of cold o-dichlorobenzene and then with petroleum ether, and is then dried in a vacuum drying oven at 70° C.

b) 7.6 g of the azo dye carboxylic acid chloride obtained in accordance with a) are heated, with stirring, together with 60 g of o-dichlorobenzene to 110° C. A solution of diamines, heated to 110° C. and containing 0.11 g of p-phenylenediamine, 0.11 g of 2-chloro-p-phenylenediamine and 1.42 g of 1,4-diamino-2,5-dichlorobenzene in 25 g of o-dichlorobenzene is then added over 2–3 minutes. The precipitated pigment is stirred for 2 hours at 140°–145° C. This pigment suspension is cooled, with stirring, to room temperature and then charged with 200 g of methanol, heated to 60° C. The mixture is heated to 60° C. and then filtered at this temperature. The residue is washed with warm methanol and then with water. After drying in the vacuum drying oven at 60° C., 8.1 g of a diazo pigment mixture are obtained, consisting of 10 mol % of C.I. Pigment Red 166, 10 mol % of C.I. Pigment Red 144 and 80 mol % of C.I. Pigment Red 214 which, compared to the single components as well as to a corresponding physical mixture, has a surprisingly higher colour strength and chroma.

EXAMPLE 2

The general procedure of Example 1b) is repeated, with the sole exception that the diamine mixture consisting of 0.11 g of p-phenylenediamine, 0.11 g of 2-chloro-p-phenylenediamine and 1.42 g of 1,4-diamino-2,5-dichlorobenzene is replaced with a diamine mixture consisting of 0.14 g of 2-chloro-p-phenylenediamine and 1.59 g of 1,4-diamino-2,5-dichlorobenzene. 6.8 g of a diazo pigment mixture are obtained, consisting of 10mol mol % of C.I. Pigment Red 144 and 90 mol % of C.I. Pigment Red 214 which, compared to the single components as well as to a corresponding physical mixture, has a surprisingly higher colour strength and chroma.

EXAMPLE 3

The general procedure of Example 1b) is repeated, with the sole exception that the diamine mixture consisting of 0.11 g of p-phenylenediamine, 0.11 g of 2-chloro-p-phenylenediamine and 1.42 g of 1,4-diamino-2,5-dichlorobenzene is replaced with a diamine mixture consisting of 0.36 g of 2-chloro-p-phenylenediamine and 1.32 g of 1,4-diamino-2,5-dichlorobenzene. 7.6 g of a diazo pigment mixture are obtained, consisting of 25 mol % of C.I. Pigment Red 144 and 75 mol % of C.I. Pigment Red 214 which, compared to the single components as well as to a corresponding physical mixture, has a surprisingly higher colour strength and chroma.

EXAMPLE 4

The general procedure of Example 1b) is repeated, with the sole exception that the diamine mixture consisting of 0.11 g of p-phenylenediamine, 0.11 g of 2-chloro-p-phenylenediamine and 1.42 g of 1,4-diamino-2,5-dichlorobenzene is replaced with a diamine mixture consisting of 0.27 g of p-phenylenediamine, 0.36 g of 2-chloro-p-phenylenediamine and 0.89 g of 1,4-diamino-2,5-dichlorobenzene. 7.8 g of a diazo pigment mixture are obtained, consisting of 25 mol % of C.I. Pigment Red 166, 25 mol % of C.I. Pigment Red 144 and 50 mol % of C.I. Pigment Red 214 which, compared to the single components as well as to a corresponding physical mixture, has a surprisingly higher colour strength and chroma. This product is a solid solution, the X-ray diffraction spectrum of which differs from that of the single components and of the corresponding physical mixture of the single components.

EXAMPLE 5

The general procedure of Example 1b) is repeated, with the sole exception that the diamine mixture consisting of 0.11 g of p-phenylenediamine, 0.11 g of 2-chloro-p-phenylenediamine and 1.42 g of 1,4-diamino-2,5-dichlorobenzene is replaced with a diamine mixture consisting of 0.72 g of 2-chloro-p-phenylenediamine and 0.89 g of 1,4-diamino-2,5-dichlorobenzene. 8.1 g of a diazo pigment mixture are obtained, consisting of 50 mol % of C.I. Pigment Red 144 and 50 mol % of C.I. Pigment Red 214 which, compared to the single components as well as to a corresponding physical mixture, has a surprisingly higher colour strength and chroma.

EXAMPLE 6

0.04 g of a diazo pigment mixture in accordance with Example 1 are mixed with 13.3 g of polyvinyl chloride (PVC EVIPOL®SH 7020, EVC GmbH, Frankfurt a.M.), 1 g of $TiO_2$ and 7.3 ml of a base mixture consisting of 92.21 % by weight of diisodecyl phthalate (VESTINOL, Hüls Chemie)
4.19 % by weight of epoxidised soybean oil (RHEOPLAST®39, CIBA-GEIGY AG), and
3.60 % by weight of heat stabiliser based on barium/zinc carboxylate (IRGASTAB ®BZ 561, CIBA-GEIGY AG).

After a wetting time of 30 minutes, the mixture is processed to a thin highly coloured red foil on a roll mill over 8 minutes at a roll mill temperature of 165° C.

EXAMPLE 7

400 g of polypropylene granulate (DAPLEN® PT-55, Chemie LINZ) and 4 g of the pigment obtained in accordance with Example 4 are intimately mixed in a mixer drum. The granulate treated in this manner is spun at 260°–285° C. by the melt spinning process, giving red fibres having excellent textile properties, such as fastness to light and wet treatment, as well as excellent colour strength and chroma.

What is claimed is:

1. A process for the preparation of a diazo pigment mixture, which comprises condensing 2 mol of an azocarboxylic acid chloride of formula

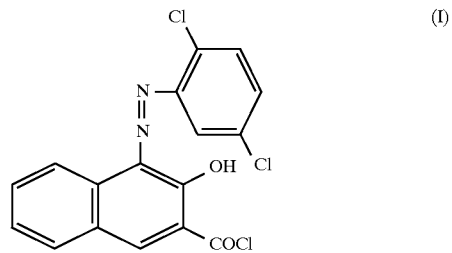

with 1 mol of a mixture of diamines of formulae

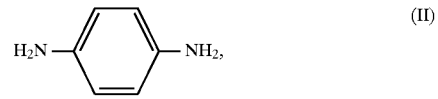

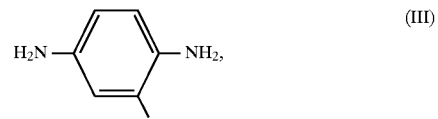

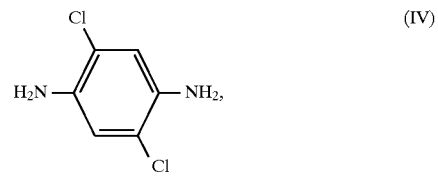

at a molar ratio of

II:III:IV from 0–30:5–60:40–95, the condensation and isolation of the product obtained being carried out by customary methods.

2. A process according to claim 1, which comprises using a diamine mixture at a molar ratio of II:III:IV from 0–25:5–50:50–90.

3. A process according to claim 1, which comprises using a diamine mixture at a molar ratio of II:III:IV from 5–15:8–30:70–87.

4. A process according to claim 1, which comprises using a diamine mixture at a molar ratio of II:III:IV of 10:10:80.

5. A solid solution consisting of the diazo pigments of formulae

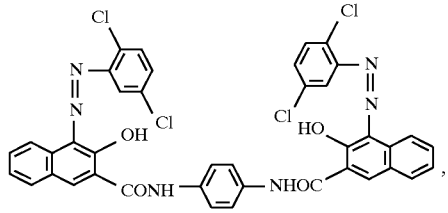

(C.I. Pigment Red 166)

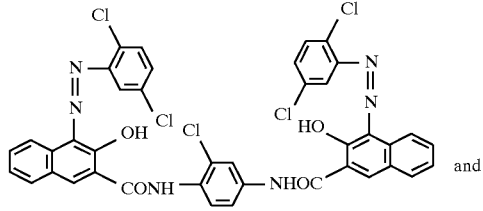

(C.I. Pigment Red 144)

(V)

(VI)

and

-continued (VII)

(C.I. Pigment Red 214)

at a molar ratio of V:VI:VII of 25:25:50.

6. A high molecular weight organic material pigmented with a diazo pigment mixture obtained by the process claimed in claim 1.

7. A high molecular weight organic material according to claim 6, which consists of polypropylene fibres.

8. A high molecular weight organic material pigmented with a solid solution according to claim 5.

9. A high molecular weight organic material according to claim 8, which consists of polypropylene fibres.

* * * * *

UNITED STATES PATENT AND TRADEMARK OFFICE
CERTIFICATE OF CORRECTION

PATENT NO. : 5,883,167
DATED : MARCH 16, 1999
INVENTOR(S) : BERNHARD MEDINGER ET AL..

It is certified that error appears in the above-identified patent and that said Letters Patent is hereby corrected as shown below:

On the title page, section [75], should read:

-- [75] Inventors: Bernhard Medinger, Giffers; Daniel Andrey, Châtel-St-Denis, both of Switzerland --.

On the title page, section [30] which was omitted, should read:

-- [30]  Foreign Application Priority Data

July 31, 1996 [CH]  Switzerland  1907/96 --.

Signed and Sealed this

Seventeenth Day of August, 1999

*Attest:*

Q. TODD DICKINSON

*Attesting Officer*  *Acting Commissioner of Patents and Trademarks*